United States Patent [19]

Itabashi et al.

[11] Patent Number: 4,727,426
[45] Date of Patent: Feb. 23, 1988

[54] DIGITAL TELEVISION RECEIVER WITH MEMORY REFRESHING CIRCUITRY

[75] Inventors: Takao Itabashi, Tokyo; Junya Saito, Saitama; Norihito Ichikawa; Yoshinori Komiya, both of Tokyo, all of Japan

[73] Assignee: Sony Corporation, Tokyo, Japan

[21] Appl. No.: 784,471

[22] Filed: Oct. 4, 1985

[30] Foreign Application Priority Data

Oct. 17, 1984 [JP] Japan ............................ 59-218079

[51] Int. Cl.$^4$ ............................................. H04N 5/44
[52] U.S. Cl. .................................. 358/188; 358/191.1; 455/186
[58] Field of Search ................. 358/188, 191.1, 193.1, 358/194.1, 10, 174, 160, 903; 455/181, 184, 185, 186

[56] References Cited

U.S. PATENT DOCUMENTS

| | | | |
|---|---|---|---|
| 4,220,967 | 9/1980 | Ichida | 358/105 |
| 4,310,924 | 1/1982 | Miyasaka | 358/186 |
| 4,545,068 | 10/1985 | Tabata | 358/903 |

Primary Examiner—Tommy P. Chin
Attorney, Agent, or Firm—Lewis H. Eslinger; Alvin Sinderbrand

[57] ABSTRACT

Method and apparatus for use with a television receiver wherein a television signal is processed in a digital form and which includes a memory for storing data to control such processing, in which a circuit is provided for refreshing the data in the memory at successive vertical blanking periods and a circuit is also provided for writing input data into the memory at the appropriate location at any time new data is desired to be input by the user. An operating method is also provided to accomplish the functional tasks of the refreshing circuit and interrupt circuit.

5 Claims, 3 Drawing Figures

DIGITAL TELEVISION RECEIVER WITH MEMORY REFRESHING CIRCUITRY

BACKGROUND OF THE INVENTION

1. Field of the Invention

This invention relates generally to a digital television receiver and, more particularly, to a method and apparatus to ensure that the digital data controlling the receiver is correct at all times.

2. Description of the Prior Art

Television receivers are now well known in which a portion or all of the relevant signal processing, following receipt of the analog television signal, is performed by digital circuitry. Typically, the signal is received and converted into a digital signal, which is processed in digital form, and then reconverted to an analog signal for display on a color cathode ray tube. Unlike conventional analog signal processing, employing various discrete components having fixed values, digital signal processing involves the retention in memories, registers, and latches of purely numerical values that correspond to the desired settings of the various video parameters, such as brightness, hue, vertical and horizontal sync, linearity, and the like.

The retention of such digital data is not a difficult task in a normal digital processor such as might be found in a computer or the like, however, it does pose a problem in equipment such as a television receiver because the receiver has associated with it not only the digital signal elements but also high voltages and pulses. Thus, a very real problem is presented in that the high voltages present in the television receiver can produce noise and transients in the overall circuit, which can adversely affect the various digital values retained at the several memory and register locations in the digital television receiver. In other words, it is possible that the data retained in the various latches, registers, and memories can be unintentionally rewritten with totally spurious data. When this happens, the receiver circuitry being controlled by this erroneous digital values might be harmed or destroyed.

OBJECTS AND SUMMARY OF THE INVENTION

Accordingly, it is an object of the present invention to provide a method and apparatus for use with a digital television receiver that can eliminate the above-noted defects inherent in the prior art.

Another object of this invention is to provide a method and apparatus for use with a digital television receiver that can prevent data being stored therein from being rewritten or altered by high-voltage pulses and noise present in the receiver.

It is another object of this invention to provide a method and apparatus for use with a digital television receiver that can periodically refresh the data contained in various digital data storage locations thereof.

In accordance with one aspect of the present invention, apparatus is provided wherein a television signal is processed in digital form and which includes a memory to store data used to control the digital processing of the television signal and a circuit is provided to refresh data in the memory at periodic intervals. Operating in connection with the memory and data refreshing circuitry is a system to accommodate the writing into the memory of new input data at any time such data is input by the user.

In another aspect of the invention, a method cooperates with a known digital signal processing method in the television receiver, in which the inventive method provides a routine for refreshing data retained at various locations within the digital television receiver at regular periodic intervals and further provides steps to accommodate the writing in of new data to the appropriate memory at any time that such new data is selected by the user during the continuing refreshing or updating process.

The above and other objects, features, and advantages of the present invention will become apparent from the following detailed description of an illustrative embodiment thereof, to be read in conjunction with the accompanying drawings, in which like reference numerals represent like elements.

DETAILED DESCRIPTION OF THE PREFERRED EMBODIMENT

Figure 1:
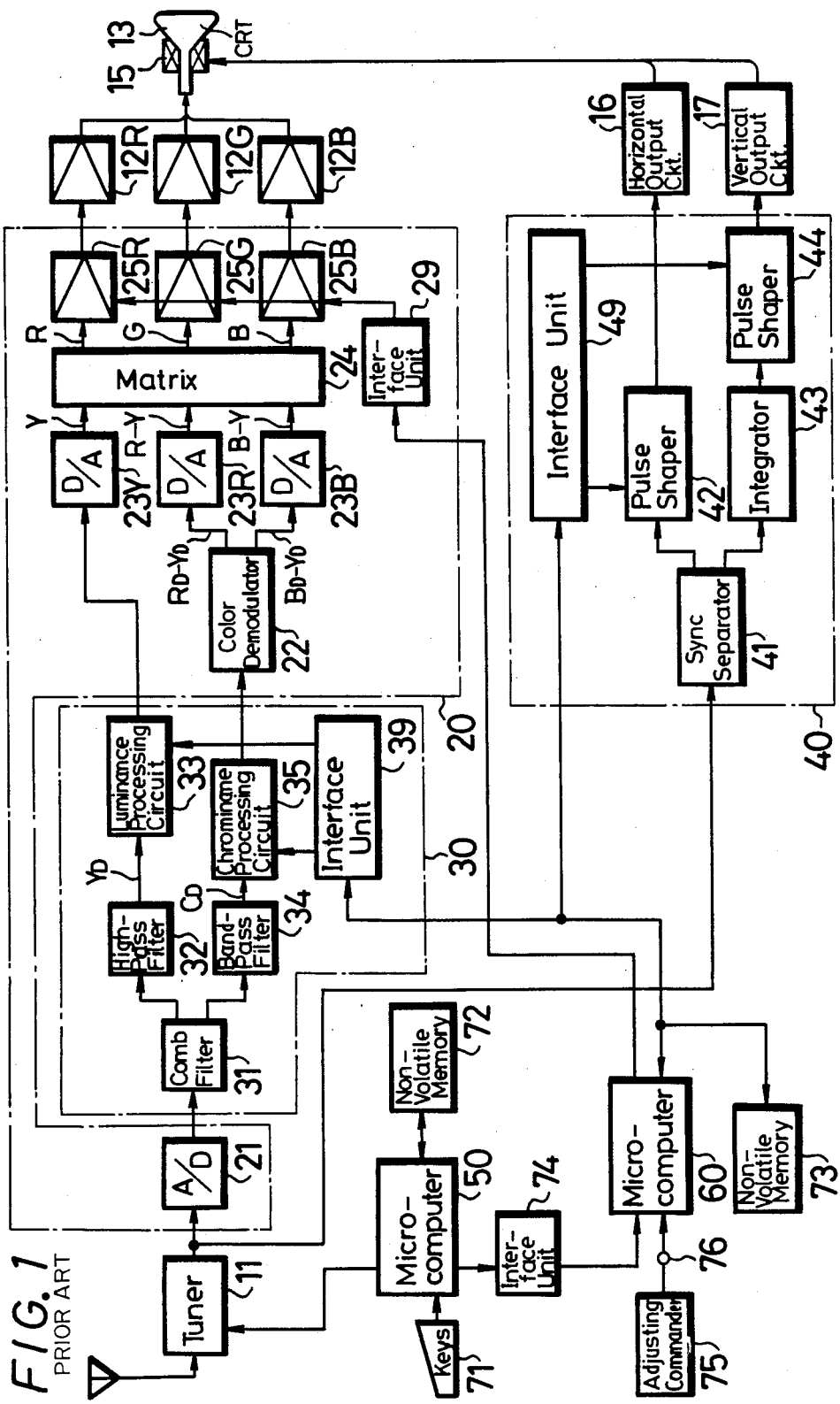
FIG. 1 is a schematic in block diagram form of a digital television receiver known in the prior art.

In order to better understand the present invention, a television receiver that employs digital signal processing as known in the prior art is shown in FIG. 1. In this system the input television signal is provided from an antenna or cable to a tuner 11 that represents generally all of the conventional tuning circuitry of a television receiver, including a synthesizer system, up to the video detecting circuit. Thus, tuner 11 provides a composite video signal fed to an analog-to-digital converter (A/D) 21, and the converted digital signal is fed to a comb filter 31 with one output thereof being fed to a high-pass filter 32, which separates out the luminance signal $Y_D$ and supplies it to a luminance processing circuit 33. Luminance processing circuit 33 is conventional and well known and is used to adjust the contrast and other parameters of the luminance signal. The luminance signal having been so processed is then fed to a digital-to-analog converter 23Y, in which it is converted back into an analog luminance signal Y. The analog luminance signal Y is then fed to a matrix circuit 24, which is conventional, in which the luminance is combined with the appropriate color signals to form the three signals (RGB) for color display.

In that regard, another output from comb filter 31 is fed to a bandpass filter 34, which produces a digital carrier chrominance signal $C_D$. This digital carrier chrominance signal $C_D$ is supplied to a chrominance processing circuit 35 to have various signal parameters adjusted therein in the conventional fashion. For example, automatic color control (ACC) can be adjusted, and hue, color (color saturation degree) and the like are corrected in chrominance processing circuit 35, and the processed chrominance signal $C_D$ is then fed to a color demodulating circuit 22. Color demodulating circuit 22 operates to demodulate digital red and blue color difference signals $(R_D - Y_D)$ and $(B_D - Y_D)$, respectively. Such digital color difference signals are then respectively fed to digital-to-analog converters 23R and 23B, wherein they are converted to analog color difference signals (R - Y) and (B - Y), respectively. The analog color difference signals (R - Y) and (B - Y) are supplied to matrix circuit 24, which operates in the conventional fashion to derive the green color signal in combination with the analog luminance signal (Y) provided from digital-to-analog converter 23Y. Matrix circuit 24 derives three primary color signals red (R), green (G), and blue (B), which are then supplied respectively by way of white balance amplifiers 25R, 25G, 25B and drive signal amplifiers 12R, 12G, and 12B to a color cathode ray tube (CRT) 13.

A digital deflection circuit is also typically provided in such television receiver and, as shown in FIG. 1, the video signal from tuner 11 is fed to a sync separating circuit 41 that produces at one output thereof a horizontal sync pulse signal fed to horizontal pulse shaper 42. The horizontal sync pulses in this signal are shaped in pulse shaper 42 to have a predetermined pulse width and phase and fed to a horizontal output circuit 16. Horizontal output circuit 16 produces the known horizontal deflection signal fed to a deflection coil 15 that is arranged in the known manner in association with a color cathode ray tube 13. Also produced by the sync separating circuit 41 is a composite sync pulse signal that is fed to an integrating circuit 43, which produces a vertical sync pulse signal. The vertical sync pulse signal is then fed to a pulse shaping circuit 44, in which the pulses are formed to have a predetermined pulse width and phase. The resultant shaped-pulse sync signal is then fed to vertical output circuit 17, which produces the known vertical deflection signal fed to the deflection coil 15 of cathode ray tube 13.

It is also known to employ in such television receiver systems employing digital signal processing one or more microcomputers or microprocessors to control the various functions of the receiver. In the example of the known system shown in FIG. 1, two microcomputers 50 and 60 are provided and each is connected with its own non-volatile memory 72 and 73, respectively. Additionally, microcomputer 50 is connected with a key panel or keyboard 71 that contains a number of keys or buttons for use by the user. Key panel 71 is conventionally known and enables the user to select a channel to be viewed and to adjust the hue, color, and so on of the television receiver. Memory 72, which is connected to microcomputer 50, is used to store the channel selection data for the channel that has been selected by the appropriate keys on key panel 71 and, in that regard, ten keys are typically provided for channel selection. Memory 72 operates to store the channel data, as well as the data for hue, color, and the like that has been selected by the user using the key panel 71, such that when the power switch of the receiver is turned OFF the data is retained so that it is available to be recalled at the time the receiver is turned back ON. The information inserted from keyboard 71 may be thought of as being offset data, representing an amount by which the particular picture parameter would be offset from a standard or reference value. All of the various parameters relating to picture quality have a center value or standard value and the data entered in memory 72 by operation or manipulation of the keys on keyboard 71 represent either increases or decreases, that is, offsets, from these standard or center values. Memory 73 is provided to contain the standard or center values of the various picture parameters that may be adjusted, or offset, by means of keyboard 71 and, in addition, memory 73 is also adapted to store, for example, data relating to white balance and horizontal and vertical deflection, that is, the linearity thereof, which the user is not able to adjust but must be adjusted by the manufacturer or a service technician working on the set. The standard value data, as well as the other data described above, is entered into memory 73 by means of an adjusting commander unit 75 that can be temporarily connected to the set, that is, to microcomputer 60, by means of a connector represented schematically at 76.

These microcomputers 50, 60 and their associated non-volatile memories 72, 73 operate, so that when the power switch of the television receiver is turned ON, microcomputer 50 reads out from memory 72 the channel data retained therein based upon the channel that had been selected at the time that the power switch of the receiver was turned OFF. Thus, non-volatile memory 72 supplies this channel information by way of microcomputer 50 to tuner circuit 11 to tune to the channel that was being viewed when the power switch of the television receiver was turned OFF. Additionally, at that time microcomputer 60 then reads out from memory 73 the white balance data and supplies such data by way of an interface unit 29 to color amplifiers 25R, 25G, 25B, whereby the three primary color signals red (R), green (G), and blue (B) are corrected in order to establish the appropriate white balance. Interface unit 29 is employed as a buffer to make certain that the logic levels of all of the signals are appropriate between the various units and also includes registers or latches that latch up, when data is provided thereto.

Additionally, microcomputer 60 reads out from non-volatile memory 73 the horizontal and vertical deflection data retained therein and supplies such data through interface unit 49 to the respective pulse shaping circuit, 42 or 44, whereby the horizontal and vertical deflecting waveforms are corrected as appropriate. Microcomputer 60 also reads out standard value data relating to hue, color, and the like from memory 73 and when microprocessor 50 reads the data relative to the offset values of the hue, color, and the like from memory 72 this data is fed to microcomputer 60 through microcomputer 50 by way of interface unit 74 and is combined with the standard or reference value data. Thus, in microcomputer 60 the offset data produced by memory 72 is added to the data relative to the standard values derived from memory 73 and the resultant summed data is then supplied through interface unit 39 to the appropriate luminance processing circuit 33 and chrominance processing circuit 35, wherein signals $Y_D$ and $C_D$ are adjusted according to the values determined by the user manipulating keyboard 71.

Accordingly, as seen from the above it is possible using a known digital television receiver to turn the set OFF and ON again and to view the channel that was set at the time the set was turned OFF and also to have the picture adjusted with the previous settings. The data read out from the memories and fed to the various interface units 29, 39, and 49 are latched therein in registers (not shown), which are provided in each of the interface units, so that the data remains set until new data is entered by use of keyboard 71.

In regard to retaining the offset values and the selected channel information, at the time the user operates keyboard 71 to select the channel, microcomputer 50 reads out from memory 72 the preset data that corresponds to the channel selected by keyboard 71 and such data is then fed to tuner circuit 11 to select the designated channel. At that same time, the data indicating the newly selected channel is written back into memory 72 to be ready for the situation when the power switch of the receiver is turned OFF while the receiver is set to the selected channel. Similarly, in regard to the picture quality, such as hue and the like, when the appropriate key on key panel 71 is operated the data corresponding to the selected offset value of the hue, for example, in memory 72 is updated and supplied by way of microcomputer 50 through interface unit 74 to microcomputer 60, wherein it is added to the standard value data as derived from non-volatile memory 73. Then, the standard data with the offset value summed therewith is supplied through interface unit 39 to chrominance processing unit 35, which carries out the appropriate hue adjustment. Similarly, at that time this offset information is also stored in non-volatile memory 72 so that, in the event the unit is turned OFF and turned ON once again, the hue selection as previously determined will once again be used to offset the standard value.

As a further note, the units 20, 30, and 40 contained within the single-dot chain lines and microcomputers 50, 60 and memories 72, 73 are typically formed of individual integrated circuit units and, for example, a commercially available television receiver might employ integrated circuits manufactured by International Telephone and Telegraph Corporation (ITT), such as those identified by the following part numbers:

IC20-VCU2100
IC30-CVPU2210
IC40-DPU2500
IC60-CCU2000
IC73-MDA2061

These integrated circuits identified above are further described in ITT literature entitled "DIGIT 2000 VLSI Digital TV System".

Accordingly, from the above-description it is seen that in known digital television receivers the data supplied to the interfaces 29, 39, and 49 are latched into registers contained in the respective interfaces and retained therein until new data arrives. Thus, amplifiers 25R, 25G, 25B, luminance processing circuit 33, chrominance processing circuit 35, pulse shapers 42, 44 are all controlled in accordance with the data latched in registers contained within the respective interface units 29, 39, 49. It is these interface units and this data which is susceptible to becoming compromised. More specifically, because there are numerous different kinds of voltages and pulses present inside a television receiver, such as the high voltage pulses applied to the color picture tube 13, there is a real possibility that the data that is latched in the registers in the interface units will be either totally rewritten incorrectly or be affected so as to be incorrect by these high voltages and noise pulses. It is this eventuality that is prevented by use of the present invention.

Figure 2:
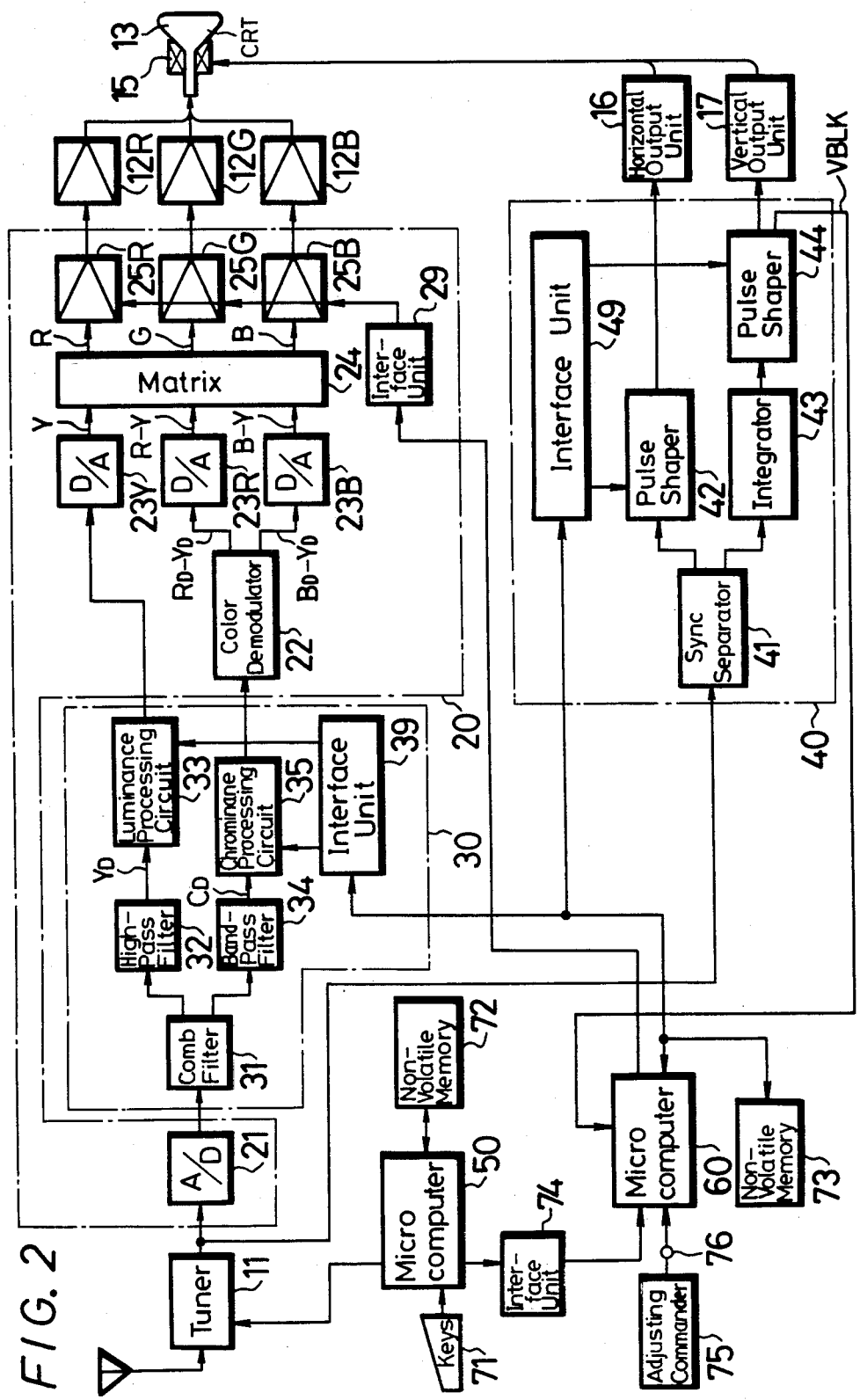
FIG. 2 is a schematic in block diagram form of a digital television receiver according to an embodiment of the present invention.

Referring now to FIG. 2, a substantially identical digital television receiver as discussed in connection with FIG. 1 is shown, except for the provision of a vertical blanking pulse VBLK from the general digital deflection unit 40. More specifically, a vertical blanking pulse signal is obtained from vertical pulse shaper 44 that is driven by the integrated signal from the vertical sync separator 41. The vertical banking pulse signal VBLK is fed back to microcomputer 60 that employs a conventional read only memory (not shown) that has stored therein a routine or operating method to accomplish the purposes of the present invention, as set forth hereinabove. This method is depicted in a flow chart set forth in FIG. 3.

Figure 3:
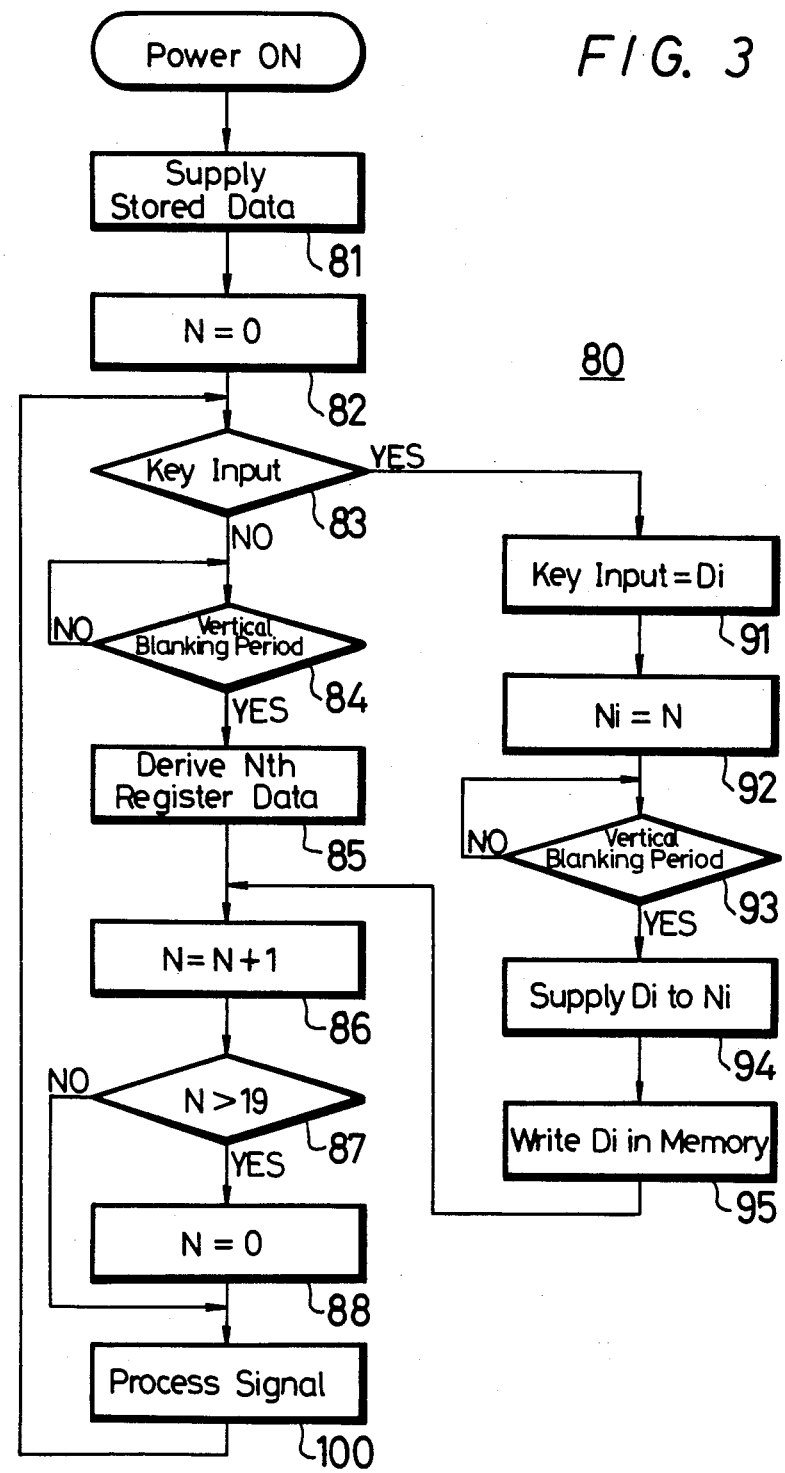
FIG. 3 is a flow chart useful in explaining operation of the digital television receiver of FIG. 2 and showing an embodiment of the method provided by the present invention.

In FIG. 3 it is seen that when the power switch (not shown) of the television receiver of FIG. 2, for example, is turned ON, the method steps 80 are initialized and the first step 81 operates so that the data stored in memories 72 and 73 are supplied to the respective appropriate portions, for example, through microcomputers 50 and 60, as described hereinabove, whereby the television receiver is then set to the state at which is was prior to the time the power switch was turned OFF. The routine then goes to step 82 at which a relationship $N=0$ is established, and in this example the variable N represents the number of registers that are available for use, such registers being those in interface units 29, 39, and 49. As an example, the total number of such registers may be approximately 20 and, thus, the relationship and $0 \leq N \leq 19$ is established.

Once variable N, the number of available registers, is set to 0, the routine goes to step 83 at which it is determined whether there is present a key input signal from key panel or keyboard 71. If no key input is then present the routine moves to step 84 at which it is determined whether the period of time in which the routine is operating is a vertical blanking period. This is determined by use of the vertical blanking pulse signal VBLK fed back from vertical pulse shaper 44 to microcomputer 60. If the period of time in which the routine is operating is not a vertical blanking period, then the method reverts to step 84 and this check is repeated until the next vertical blanking period arrives.

Once the time of step 84 coincides with a vertical blanking period, as determined by signal VBLK, then step 85 is performed at which the data for the $N^{th}$ register is derived from memory 73 and such data is then supplied to the $N^{th}$ register. At the time data is stored in memory 72, the corresponding data is stored temporarily in the registers of interface 74 by means of microcomputer 50 and is then supplied from interface 74 to the corresponding register in the television receiver during the vertical blanking period. Accordingly, step 85 of the routine operates to refresh the $N^{th}$ register during the vertical blanking period. This is a significant point, because it indicates that the information in at least one of the registers is refreshed or revived, or at least checked, during a vertical blanking period and, thus, by stepping through all of the various registers all of the data stored therein is ultimately refreshed.

In any event, and subsequent to step 85, the routine moves to step 86 at which the register variable N is incremented by "1", and the routine moves to step 87 to determine whether the value of variable N is up to its maximum, which corresponds to the total possible number of registers. If the value of number N is greater than the total number of registers, and in this example the total number of registers is 20 so the value of N can not exceed 19, the routine moves to step 88 at which N is reset to 0 and the method performs step 100. In the event that N is not yet up to the maximum value, that is, is not greater than 19, then the next step is 100 as well. During step 100 the appropriate signal processing occurs, such as automatic white balance and the like, and once such appropriate command has been issued the entire routine reverts back to step 83 and each method step is performed again. Accordingly, if in step 83 there is no key signal from the key panel 71, it is seen that the registers of the interface units 29, 39, and 49 are repeatedly refreshed in turn at each successive vertical blanking period. In this specific embodiment, the reason for refreshing only one register at a time, is that in the practical operating system such data refreshing operation takes a relatively long time and to be on the safe side it is best to refresh only a single register during one vertical blanking period. Accordingly, it is seen then assuming that there are a total of 20 registers, it will require only 20 vertical field periods to refresh all of the registers in this digital television receiver.

In a situation when the user operates one of keys on the keyboard 71, thereby causing a key signal to be present, the routine moves from step 83 to step 91, at which step the data Di that corresponds to the specific key that has been manipulated is formed and then the routine moves to step 92. In step 92, the number of the register Ni into which the data Di should be written is set at variable N, that is, N=Ni. Once such register value is set, the time period is checked in step 93 to determine whether it corresponds in time to a vertical blanking period. If a vertical period is present, as determined by the vertical blanking pulse signal VBLK, then data Di is supplied to the register selected as number Ni and is written therein in step 94. Thus, at this point the television receiver is placed in the appropriate receiving state that was designated by the key actuated at step 83. Once the key signal data is supplied to the appropriate register, the routine moves to step 95, at which the data is actually written into the corresponding address of memory 72 and after such writing operation has taken place, the routine moves back to step 86. In regard to step 93, if a vertical blanking period is not present then that step is repeated until a vertical blanking pulse VBLK is present and then the routine proceeds.

Thus, as described hereinabove, according to the present invention, the data stored in the registers of the respective interface units 29, 39, and 49 are sequentially refreshed at every vertical blanking period so that even if data stored in a register is rewritten or damaged by noise present in the receiver the damaged data can be corrected almost immediately, thereby precluding resultant trouble in the system caused by such erroneous data. Moreover, because a register is refreshed only during the vertical blanking period the actual displacement of the picture on the cathode ray tube screen will not change in the midst of a picture display, that is, there will be no change half-way through a picture and any changes occurring during a vertical blanking interval will essentially be undetectable by the viewer.

Additionally, although the registers are normally sequentially refreshed in a predetermined order, when the user operates a button on the keyboard 71, the new data is then written in a dominant fashion in the corresponding register, regardless of the place in the sequential order then in force for refreshing that register. The result of this is that the television receiver responds quite quickly to the actuation of the keyboard and provides the user with convenience in using the receiver. In other words, if the writing of the new data into the corresponding register is not performed until the corresponding register is refreshed, even in the worse case, the television receiver cannot respond to the key input until the elapse of 20 field periods, which corresponds to a little over 0.3 seconds. Nevertheless, according to the present invention even this minute delay is not present, and the television receiver responds immediately to a key input, thereby giving the user a better feel of control over the system.

The above description is provided for a single preferred embodiment of the invention, however, it will be apparent that many modifications and variations could be effected by one skilled in the art without departing from the spirit or scope of the novel concepts of the invention, which should be determined only by the appended claims.

What is claimed is:

1. Apparatus for use with a television receiver in which a television signal is processed in digital form, the apparatus comprising:
   processing control means for controlling the digital processing of the television signal;
   memory means having a number of digital data storage locations connected to said processing control means for storing digital data used thereby in controlling said processing;
   mirocomputer means connected to said memory means for sequentially refreshing data stored at each location therein on a basis of one location at a time at regular periodic intervals;
   means connected to said microcomputer means for selecting said regular periodic intervals to be vertical blanking periods of the televsion signal; and
   keyboard means operably connected to said processing cotnrol means and adapted to be actuated by a user of the television receiver for inputting data to control operation of the television receiver, said microcomputer means being further connected to said keyboard means for controlling said memory means for writing input data into said memory means upon actuation of said keyboard means.

2. Apparatus according to claim 1, in which said memory means includes a non-voltile re-writable memory and a plurality of interface registers.

3. A method for use with a television receiver for digitally processing a television signal that is converted into a digital signal and controlled by digital data stored in a memory, in which there are a number of locations for storing the digital data, and having a keyboard for inputting new data upon actuation by the user of the television receiver, comprising the steps of:
   cyclically refreshing the digital data stored at each location in the memory, one location at a time, at regular periodic intervals corresponding to vertical blanking periods of the television signal; and
   writing said new data input by the user into the memory at any time during said regular periodic intervals upon inputting said new data by the user.

4. Apparatus for use with a television receiver in which a television signal is digitally processed, the apparatus comprising:
   process control means for controlling digital processing of the television signal in accordance with digital data input thereto;
   register means having a number of digital data storage locations and being connected to said process control means for temporarily storing said digital data used by said process control means for controlling processing of said television signal;
   memory means for providing said digital data temporarily stored in said register means;
   microcomputer means connected to said memory means and said register means for sequentially refreshing digital data stored at each location in said register means, one location at a time, with digital data from said memory means;

means connected to said microcomputer means for selecting said regular periodic intervals to be vertical blanking periods of the television signal; and keyboard means operably connected to said microcomputer means and adapted to be manually actuated by a user of the television receiver for inputting data to control operation of the television; said microcomputer means further controlling said memory means for writing input data into said memory means upon actuation of said keyboard means.

5. Apparatus according to claim 4, in which said memory means includes at least one non-volatile, rewritable memory and said register means is adapted to form part of an interface unit between said memory means and said process control means.

* * * * *

UNITED STATES PATENT AND TRADEMARK OFFICE
CERTIFICATE OF CORRECTION

PATENT NO. : 4,727,426
DATED : February 23, 1988
INVENTOR(S) : Takao Itabashi et al.

It is certified that error appears in the above-identified patent and that said Letters Patent is hereby corrected as shown below: On the title page:

In the abstract, first line, change "Method" to --A method--.
Column 6, line 20, change "O≤N≤" to --O≤N≤--.

IN THE CLAIMS

Column 8, line 12, change "signaI" to --signal--;
　　　　　line 20, change "mirocomputer" to --microcomputer--;
　　　　　line 26, change "televsion" to --television--;
　　　　　line 28, change "ctnrol" to --control--;
　　　　　line 36, change "non-voltile" to --non-volatile--.

Signed and Sealed this

Eighth Day of November, 1988

Attest:

DONALD J. QUIGG

Attesting Officer　　　Commissioner of Patents and Trademarks